United States Patent [19]

Kaneko et al.

[11] Patent Number: 4,610,539
[45] Date of Patent: Sep. 9, 1986

[54] METHOD FOR AUTOMATICALLY SELECTING A LENS

[75] Inventors: Rokusaburo Kaneko; Yuji Takenaka, both of Kaisei, Japan

[73] Assignee: Fuji Photo Film Co, Ltd., Kanagawa, Japan

[21] Appl. No.: 759,439

[22] Filed: Jul. 26, 1985

Related U.S. Application Data

[63] Continuation-in-part of Ser. No. 610,817, May 15, 1984, abandoned.

[30] Foreign Application Priority Data

May 20, 1983 [JP] Japan ................................ 58-88890

[51] Int. Cl.⁴ ............................................. G03B 27/32
[52] U.S. Cl. .................... 355/77; 354/195.12; 355/55; 356/125
[58] Field of Search ............... 355/55, 77; 354/195, 354/12; 356/124, 125

[56] References Cited

U.S. PATENT DOCUMENTS

| | | | |
|---|---|---|---|
| 3,008,577 | 11/1961 | Miles | 356/125 X |
| 3,917,409 | 11/1975 | Kaestner | 356/125 |
| 4,316,668 | 2/1982 | Miller | 355/55 |
| 4,412,737 | 11/1983 | Iwanade et al. | 355/55 |
| 4,441,805 | 4/1984 | Smith | 355/55 X |

*Primary Examiner*—Richard A. Wintercorn
*Attorney, Agent, or Firm*—Wenderoth, Lind & Ponack

[57] ABSTRACT

Some of the conventional photographic printers are provided with plurality of lenses with different magifications. In order to change the size of enlargement (or magnification of enlargement), it is necessary for an operator to manually replace a lens or to select a suitable lens among the plural lenses on a revolving lens turret by pressing a selecting button. In this manipulation, the selection of lens and the correction of exposure for the selected lens are left to the operator's judgement. Replacement of lenses in accordance with the change in the size of enlargement involves much trouble in itself. The conventional printers are thus defective in that the printing process does not proceed smoothly. The present invention is to provide an automatic lens selection method for selecting a lens unit among a plurality of lens units having different focal lengths in accordance with a designated magnification of enlargement, which is characterized by the steps of selecting a lens unit having the greatest focal length among the plural lens units, calculating the conjugate length thereof based on the magnification of enlargement and the focal length of the lens, judging whether the calculated conjugate length falls within the effective range of a system, searching a lens unit having the second greatest focal length if the conjugate length falls outside the effective range and repeating the above procedure until a lens unit falling within the effective range is selected.

6 Claims, 10 Drawing Figures

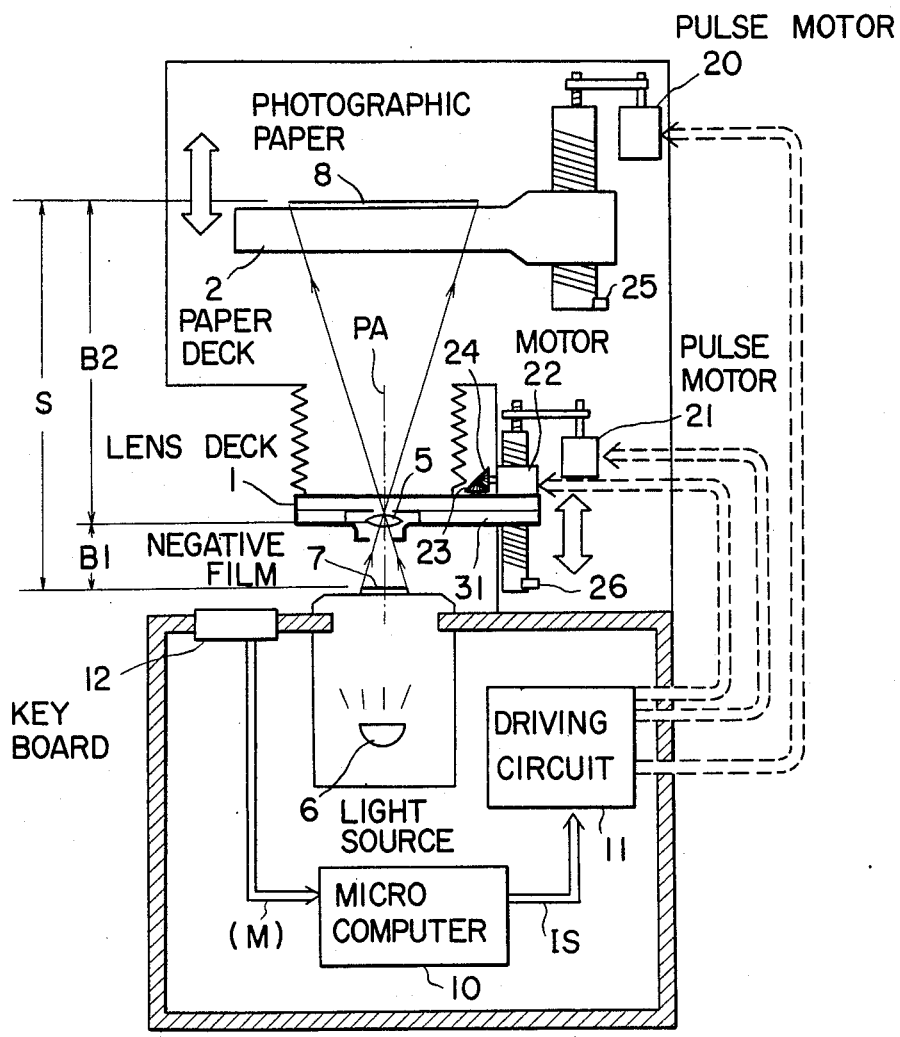

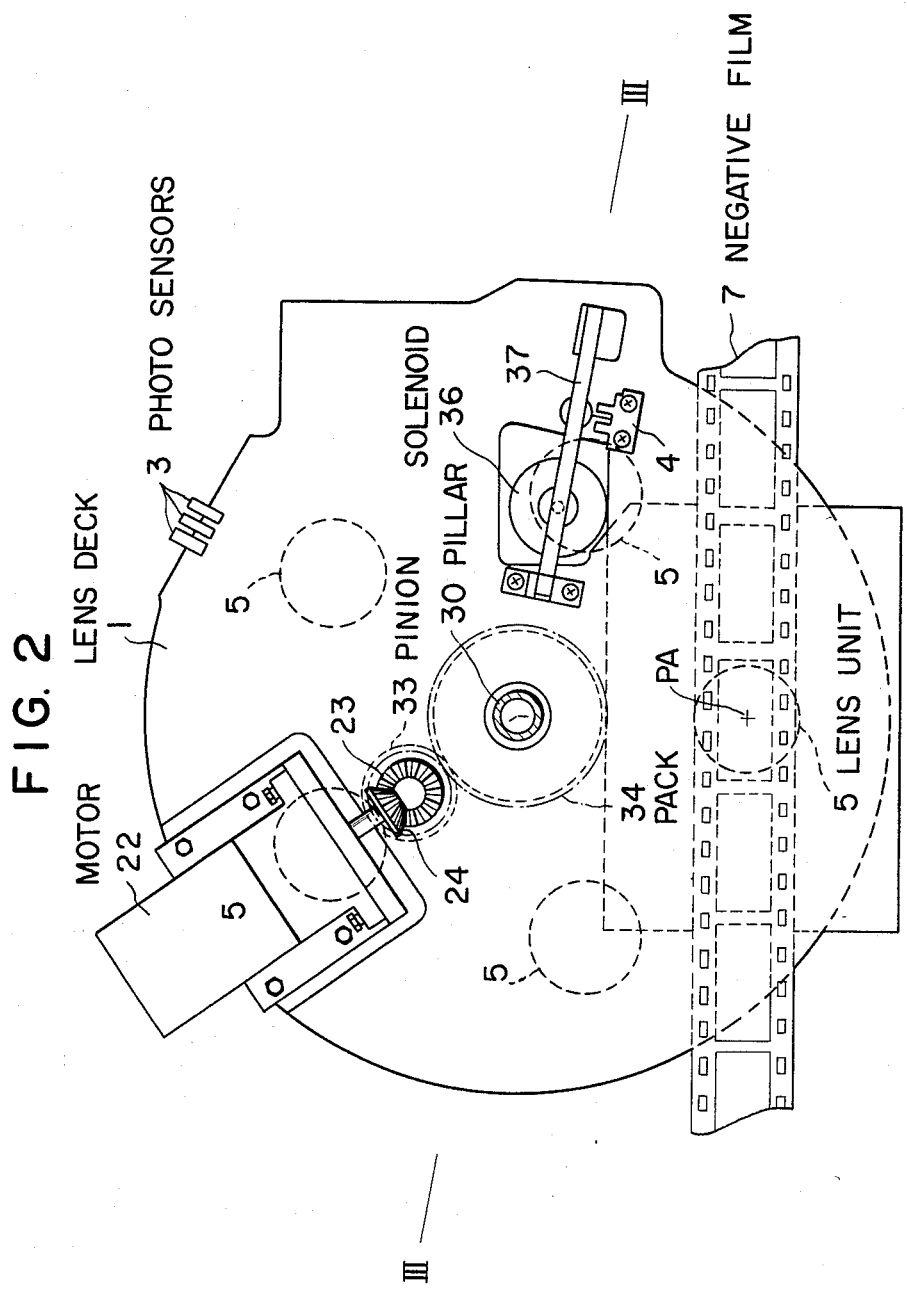

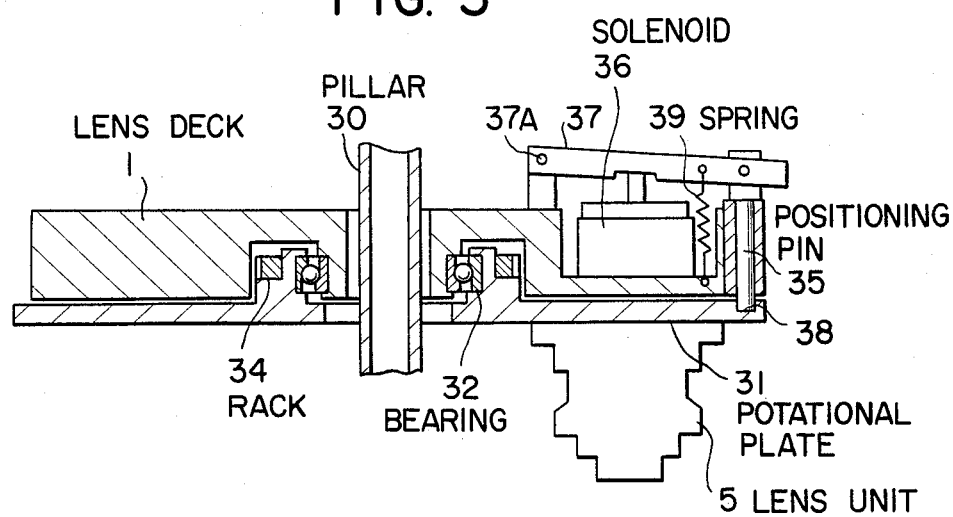
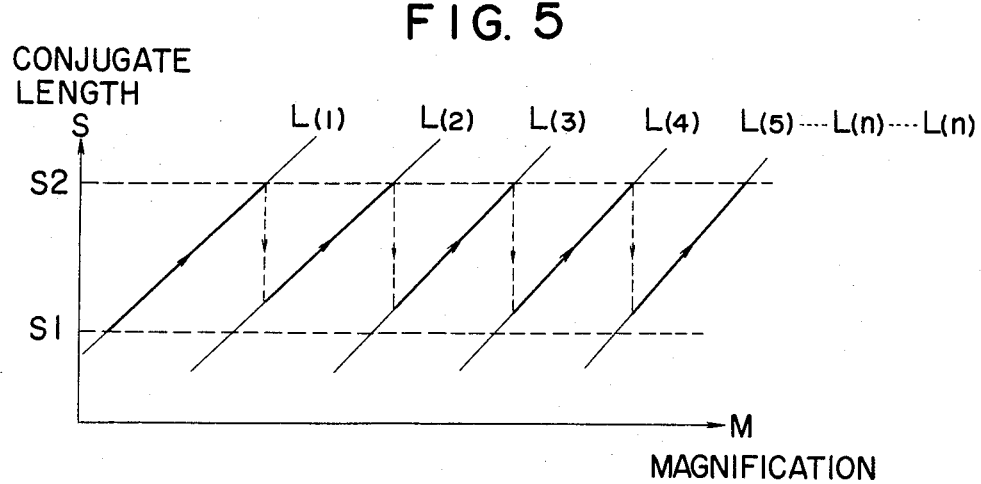

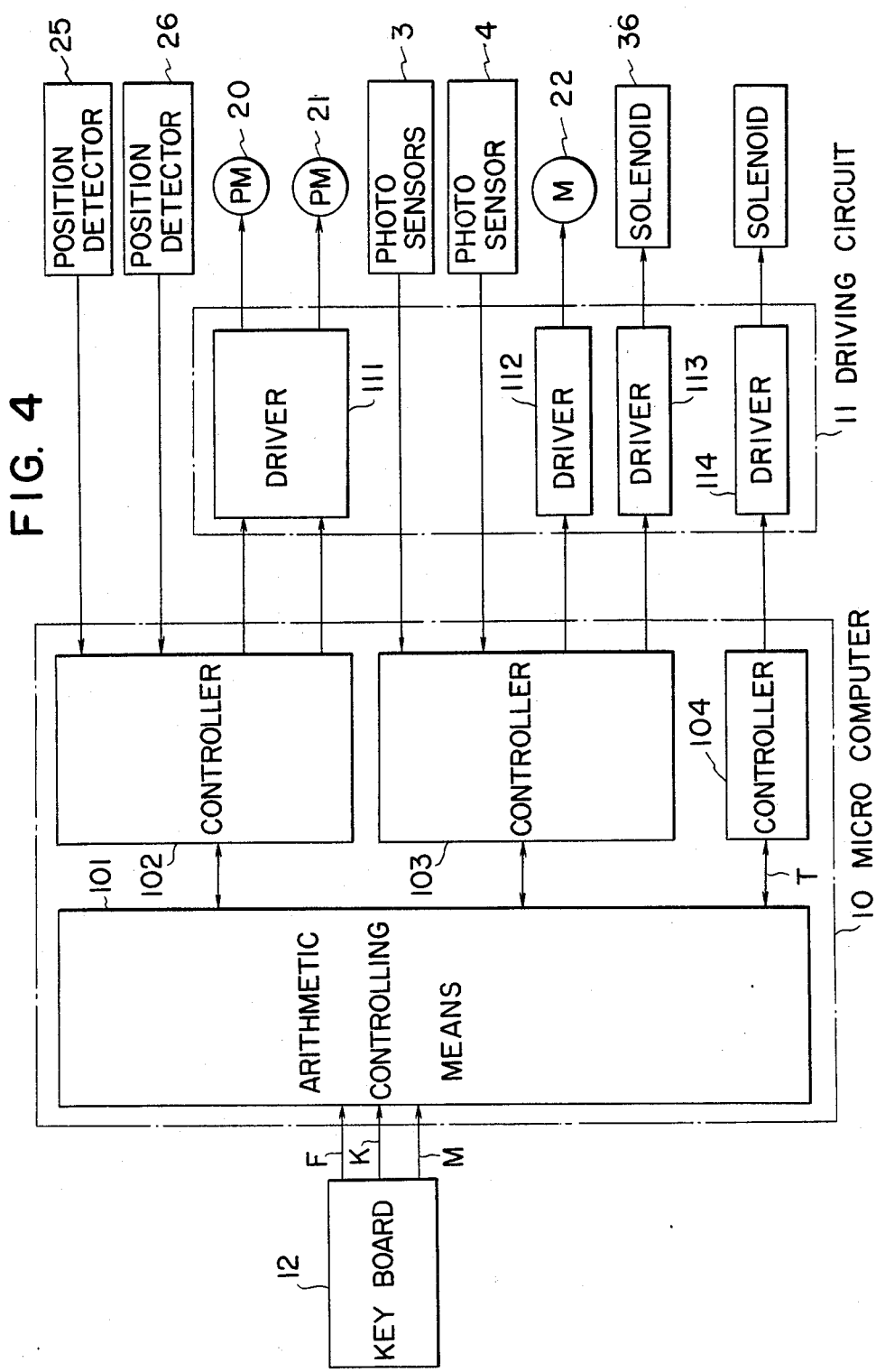

METHOD FOR AUTOMATICALLY SELECTING A LENS

CROSS-REFERENCE TO RELATED APPLICATION

This application is a continuation in part of our prior application Ser. No. 610,817, filed on May 15, 1984, entitled "METHOD FOR AUTOMATICALLY SELECTING A LENS", and now abandoned.

BACKGROUND OF THE INVENTION

The present invention relates to a method for automatically selecting a lens unit among plural lens units having different focal lengths and mounted on a photographic printer and the like.

Some of the conventional photographic printers are provided with a plurality lenses with different magnifications. In order to change the size of enlargement (or magnification of enlargement), it is necessary for an operator to manually replace a lens or to select a suitable lens among the plural lenses on a revolving lens turret by pressing a selector button. In this manipulation, the selection of lens and the correction of exposure for the selected lens are left to the operator's judgement. Replacement of lenses in accordance with the change in the size of enlargement involves much trouble in itself. The conventional printers are thus defective in that the printing process does not proceed smoothly.

SUMMARY OF THE INVENTION

An object of the present invention is to provide a method for automatically and promptly selecting a lens unit in accordance with changes in the magnification of enlargement in a photographic printer and the like.

Another object of the present invention is to provide an automatic lens selection method which automates lens switching in accordance with the changes in the enlargement magnification and thereby enables smooth printing operations and so on.

Accordingly, there is provided an automatic lens selection method for selecting a lens unit among plurality of lens units having different focal lengths in accordance with a designated magnification of enlargement, which is characterized by the steps of selecting a lens unit having the greatest focal length among said plural lens units, calculating the conjugate length thereof based on the magnification of enlargement and the focal length of said lens unit, judging whether the calculated conjugate length falls within the effective range of system, searching a lens unit having the second greatest focal length if said conjugate length falls outside the effective range and repeating the above procedure until a lens unit falling within the effective range is selected.

The nature, principle and utility of the invention will become more apparent from the following detailed description when read in conjunction with accompanying drawings.

BRIEF DESCRIPTION OF THE DRAWINGS

In the accompanying drawings:

FIG. 1 is a schematic view showing a photographic printer to which the present invention is applied;

FIG. 2 is a plan view of the lens deck in the photographic printer;

FIG. 3 is a sectional view of the lens deck at line III—III thereof;

FIG. 4 is a block diagram showing the control system of the photographic printer;

FIGS. 5 and 8 are schematic charts to explain the lens selection method according to the present invention, respectively;

DETAILED DESCRIPTION OF THE INVENTION

Figure 6:
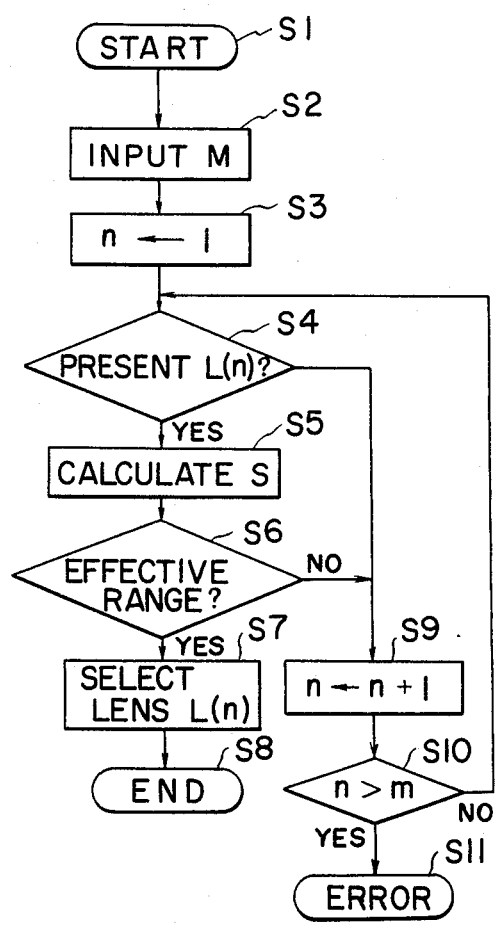
FIGS. 6 and 7 are flow charts to showing the procedure of the lens selection method, respectively.

The present invention will now be described in detail.

Referring to FIG. 1 which shows a schematic view of a photographic printer with a mechanism of which the enlarging magnification is variable, the light from a light source 6 illuminates a negative film 7 and is exposed on a photographic paper 8 as it is transmitted through a lens unit 5 which forms an optical system. At this time a frame image of the negative film 7 is enlarged or reduced by the lens unit 5 and is exposed on the photographic paper 8. The lens unit 5 is mounted on a rotational plate 31 which is rotatable and has a plurality of lens units with different focal length, and the photographic paper 8 is provided on a paper deck 2. A lens deck 1 is engaged with the rotational plate 31 in a body. When the position of the negative film 7 is fixed, it is possible to freely set the enlarging magnification elevating the positions of the photographic paper 8 and the lens unit 5 or by changing the focal length of the lens unit 5. Assuming that the distance between the negative film 7 and the lens unit 5 is B1, the distance between the lens unit 5 and the photographic paper 8 is B2 and that the focal length of the lens unit 5 is f so as to focus the image of the negative film 7 on the photographic paper 8, it is required to establish the following equation.

$$\frac{1}{f} = \frac{1}{B1} + \frac{1}{B2} \quad (1)$$

At this condition the enlarging magnification M is expressed as follows;

$$M = \frac{B2}{B1} = \frac{S - B1}{B1} \quad (2)$$

The sum of the distances B1 and B2 will become the conjugate length S. The conjugate length S is the distance between the negative film 7 and the photographic paper 8 and is therefore limited by the distance where the printer is mechanically movable in the maximum length. The maximum conjugate lenght with respect to the plural lens units must therefore be smaller than the maximum distance of the mechanical movement of the photographic printer. This is reffered to as the effective range in the description hereinafter.

The elevating operations of the photographic paper 8 and the lens unit 5 are performed by moving the positions of the paper deck 2 and the lens deck 1 according to the drivings of pulse motors 20 and 21, respectively. The rotational plate 31 to which the lens unit 5 is attached is rotated through a motor 22 and bevel gears 23 and 24 which are incorporated with the motor 22 and the lens deck 1, and a plurality of lens units with different focal length are mounted on the rotational plate 31 in a circular shape. One of the lens units is selectively positioned at a printing optical axis PA by rotating the rotational plate 31. Instruction signals IS outputted from a micro computer 10 are applied to the pulse motors 20 through 22 through a driving circuit 11. The enlarging magnification M is manually inputted to the micro computer 10 from outside by a key board 12. Position detectors 25 and 26 are operatively engaged with the paper deck 2 and lens deck 1, respectively.

The operation will now be explained in detail referring to FIGS. 2 and 3. FIG. 2 shows a view of the lens deck 1 and FIG. 3 is a sectional view of III—III in FIG. 2.

The control of the height positions B1 and B2 of the photographic paper 8 and the lens unit 5 is carried out as follows; First, the paper deck 2 and the lens deck 1 are elevated by the drivings of the pulse motors 20 and 21 through the micro computer 10 and are once stopped at the respective reference positions, respectively. The lens deck 1 elevates along a center pillar 30 with the rotational plate 31. The positions thereof to be stopped are respectively detected by the position detectors 25 and 26 and then the detecting signals are respectively inputted to the micro computer 10. Since the distances B1 and B2 are set in advance in the micro computer 10 according to the enlarging magnificalion M inputted by the key board 12, the required pulses are calculated in the micro computer 10 and then applied to the pulse motors 20 and 21 through the driving circuit 11 so that the distance B1 and B2 respectively become to the predetermined values.

Referring to FIGS. 2 and 3 which show schematic views of the lens deck 1 attached to the photographic printer, the rotational plate 31 which is rotatable around the pillar 30 is operatively attached to the back surface of the lens deck 1 through a bearing 32. A plurality of lens units are mounted on the back surface of the rotational plate 31 with the adequate intervals for the rotational direction, and the respective lens units have some lenses for focusing the image. The rotation of the rotational plate 31 is performed by the driving of the motor 22 which is mounted on the surface of the lens deck 1. Namely, the bevel gear 24 is mounted at the output axis of the motor 22, the bevel gear 24 is operatively incorporated with the bevel gear 23 which is connected to a pinion 33 which is in the back side of the lens deck 1. The pinion 33 is engaged with a ring shape rack 34 whcih is provided at the upper portion of the rotational plate 31 and at around the center pillar 30 thereby to rotate the rotational plate 31 around the pillar 30 through pinion 33 and the gears 23 and 24 by driving the motor 22. The rotation of the rotational plate 31 is exactly positioned by a positioning pin 35 so that the selected lens unit 5 accurately coincides with a printing optical axis PA as shown in FIG. 2.

The positioning pin 35 is mounted to the tip of a lever 37 which receives a driving force of a solenoid 36 or a tensile force of a spring 39. The lever 37 is swung around an axis 37A by the driving force or the tensile force. The positioning pin 35 is pulled out from a positioning hole 38 which is formed on the rotational plate 31 at predetermined intervals by exciting the solenoid 36, and then the rotational plate 31 is rotated around the pillar 30 by driving the motor 22. The tip of the positioning pin 38 is inserted into the positioning hole 38 due to the tensile force of the spring 39 by unenabling the solenoid 36 thereby precisely position the desired lens unit 5 to the printing optical axis PA. The operational condition of the lever 37 is detected by a photo sensor 4, and the detecting signal is inputted to the micro computer 10.

Discrimination holes are in circumference provided on the rotational plate 31 corresponding to the respective lens units, the lens unit which is positioned at the printing optical axis PA is always detected by discriminating the discrimination holes with the photo sensors 3 which are provided at the peripheral of the lens decks 1. Further, the focal lengths for respective lens units are memorized in the micro computer 10 in advance.

The circuit system of the printer is shown in FIG. 4 in detail. The focal length F, the correction amount K for printing and the enlarging magnification M from the key board 12 are inputted to an arithmetic controlling means 101 in the micro computer 10. The micro computer 10 has controllers 102, 103 and 104, and the controller 102 controls the position of the lens deck 1 and the paper deck 2, the controller 103 position of the lens units and the controller 104 a solenoid for a shutter (not shown) according to the exposure time T.

With the above construction an arbitrary lens unit on the rotational plate 31 is selected and positioned at the printing optical axis according to the instruction signals IS from the micro computer 10.

Here, the plural lens units mounted on the rotational plate 31 are represented by $L(1), L(2), \ldots L(n), \ldots L(m)$, the focal length by $L(1) > L(2) > L(3) \ldots > L(n) \ldots > L(m)$, and the effective range of the conjugate length S by $S_1$ to $S_2$ as shown in FIG. 5. The letter n denotes a unit number.

In order to select a lens unit which minimizes insufficient peripheral exposure or distortion, the arrangement of lens unit is scanned to detect the presence of a lens unit consecutively from the lens unit of the longest focal length and if the presence of a lens unit is detected, a conjugate length S is sought from the designated magnification M and the focal length F(n). In case the conjugate length S does not fall under the effective range, a lens having a second longest focal length is selected. In this manner, a lens unit having the longest focal length with respect to a given magnification of enlargement is to be selected at all times. This is because a lens unit with smaller focal length is generally more susceptible to effects caused by insufficient peripheral exposure or distortion when a given size of negative film is enlarged by the same magnification.

One example of the operation will be described in more detail referring to the flow chart shown in FIG. 6.

As an operator inputs new data M to change the magnification for enlargement (Steps S1 and S2), n is designated as "1" to select a lens unit L(1) with the longest focal (Step S3) and whether such lens unit L(1) is present or not is judged (Step S4). In case the lens unit L(1) is present, the conjugate length S is calculated from an equation $S = F \cdot (M + 1/M + 2)$ wherein M is the input magnification and F the focal length of the lens unit (Step S5) to decide whether the conjugate length S falls under the effective range of the photographic printer (Step S6). If YES, the lens selection is completed as the lens L(1) is selected (Steps S7 and S8). In case NO, lens unit is available at the Step S4 or in case the lens unit falls outside the effective range at the Step S6, operation with "+1" will be conducted to select a lens unit with the second longest focal length (Step S9). Upon the operation, the value obtained is judged whether it is greater than that of the lens unit with the smallest focal distance L(m) (Step S10). In case the selected lens unit is smaller in the focal length than the lens unit with the smallest focal length, the operation is judged erroneous (Step S11). In case the value obtained is acceptable, the above procedure is repeated starting from the Step 5 skipping the steps S1 through S4. Thus, as shown by arrows in FIG. 5, a lens unit with a focal length falling under the range of conjugate length of the designated magnification M can be automatically selected by starting from a lens unit L(1) with the longest focal length in succession to a lens unit L(m) with the smallest focal length.

On the other hand, in order to select a lens unit which minimizes the exposure time, the lens selection is started from a lens unit having the smallest focal length L(m) to see if a lens unit with the focal length suitable for the specified enlargement magnification M is available. At the same time, lens units having focal lengths greater than that of the lens unit are checked to see if they can cover the enlargement magnification M. If YES, the f-value (the diaphragm value) of the lens units are compared and if the lens unit of the greater focal length does not cover the magnification M, the lens unit with smaller f is selected. In case the lenses having greater focal lengths do not cover the magnification M, the lens unit with smaller f is selected. This is based on the fact that when two given lens unit having different focal lengths are identical in the f-value, the exposure times thereof with respect to a given magnification M becomes equal to each other regardless of the focal lengths. With a given f-value, however, the greater the lens units are in the focal length, the greater they become in the aperture, thus being more costly in practice. It is therefore general to employ a lens unit which is greater in the f-value when the lens unit is greater in the focal length.

Figure 7:
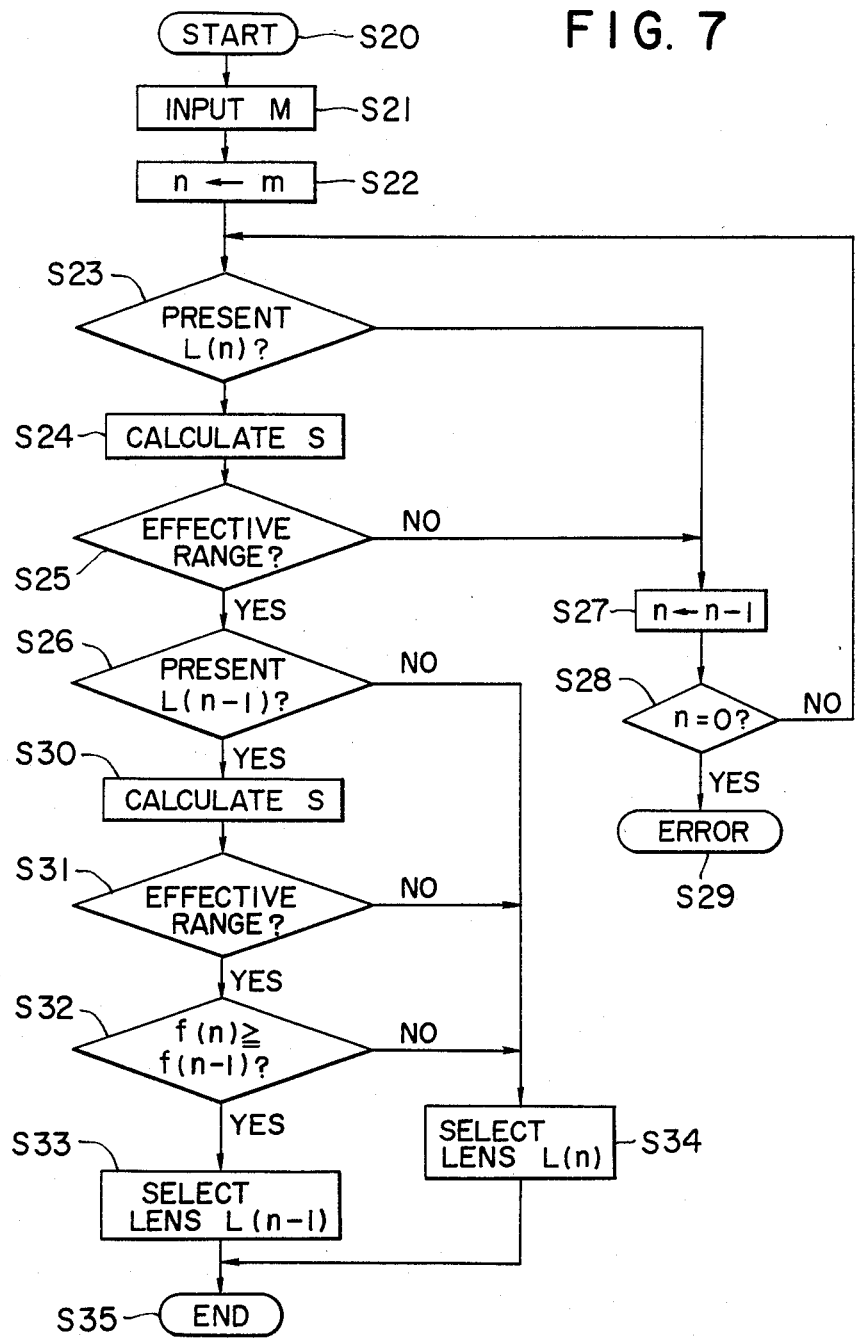

Details of this selection method are shown in the flow chart of FIG. 7. The operation will now be explained referring to the flow chart.

Figure 8:
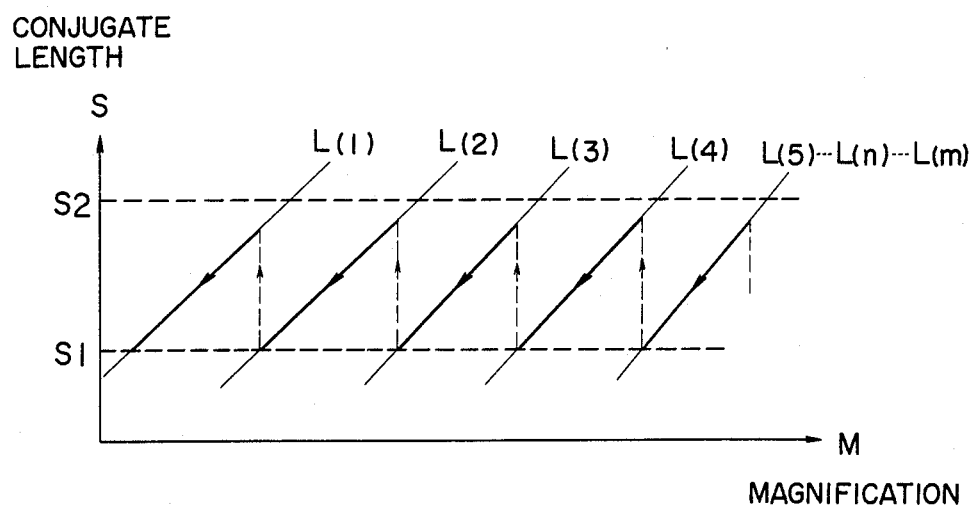

Steps S20 through S25 are identical with the steps S1 through S6 of the flow chart in FIG. 6. The ordinal number of lens unit is designated as "−1" for operation to judge if the value is "0" (Steps S27 and S28) when the lens units are replaced (Step S27). If the value obtained is "0", the operation is deemed erroneous as it designates a lens unit other than the one mounted (Step S29). If the value obtained is not "0", then the steps up to the Step S23 are skipped. If the lens unit is judged as falling within the effective range at the Step S25, it is to be judged if there is a lens unit L(n−1) with the focal length one degree smaller than the designated lens unit L(n) (Step S26) or not. A conjugate length S for the lens L(n−1) is calculated. At the same time, it is judged whether the lens unit falls within the effective range (Steps S30 and S31) or not. If the lens unit L(n−1) falls within the effective range, the lens unit L(n) designated at the Step S23 is compared with the lens unit L(n−1) for the value f (Step S32). If the lens unit L(n) is identical or greater in the value f as compared with the lens unit L(n−1), then the lens unit L(n−1) designated at the Step S26 will be selected (Steps S33 and S35). In case there is no lens unit L(n−1) having the focal length greater than that of the lens unit L(n) at the Step S26, or if the lens unit is judged as falling outside the effective range at the Step S31, or if the lens unit L(n−1) is greater in the value f than the lens unit L(n), then the lens unit L(n) designated at the Step S23 will be selected in any of these cases (Step S34). Thus as shown by arrows in FIG. 8, the lens unit are searched in sequence starting from the lens unit with the smallest focal length L(m) to the lens unit with the greatest focal length L(1).

Figure 9:
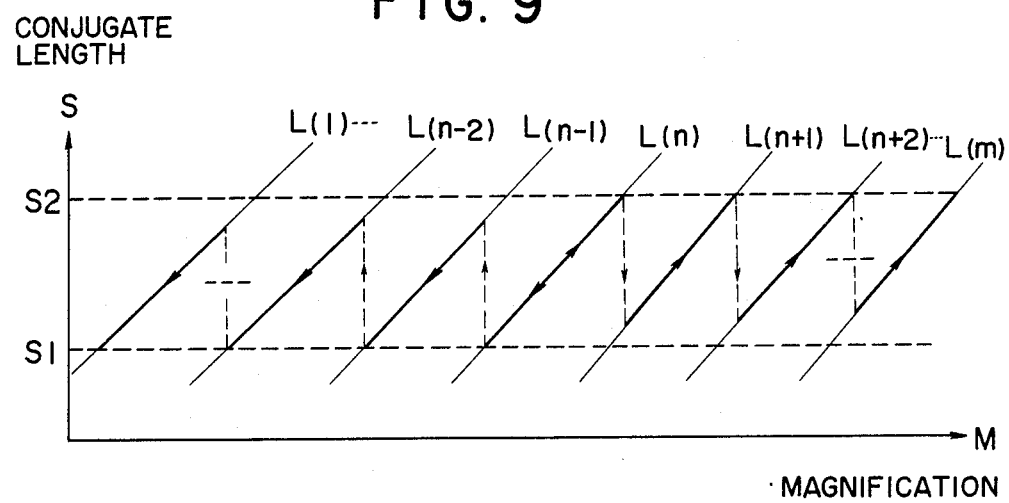
FIG. 9 is an explanatory chart to showing another present invention method.

In case a given lens unit is first designated with priority before selecting a desired lens unit, the priority unit is designated as L(n) as shown in FIG. 9, and the conjugate length S for thus designated lens unit L(n) is calculated as mentioned above. It is judged whether the priority lens unit L(n) covers the enlargement magnification M based on the comparison between the calculated conjugate length S and the effective range $S_1$ to $S_2$ of the printer. If the lens unit L(n) does not cover the magnification M, search is started in sequence either from an adjacent lens unit L(n−1) having greater focal length or from another adjacent lens unit L(n+1) having smaller focal length depending on the result of the comparison mentioned above. Thus by designating a lens unit in frequent use as the priority lens unit L(n), lenses can be automatically selected at a higher speed.

Figure 10:
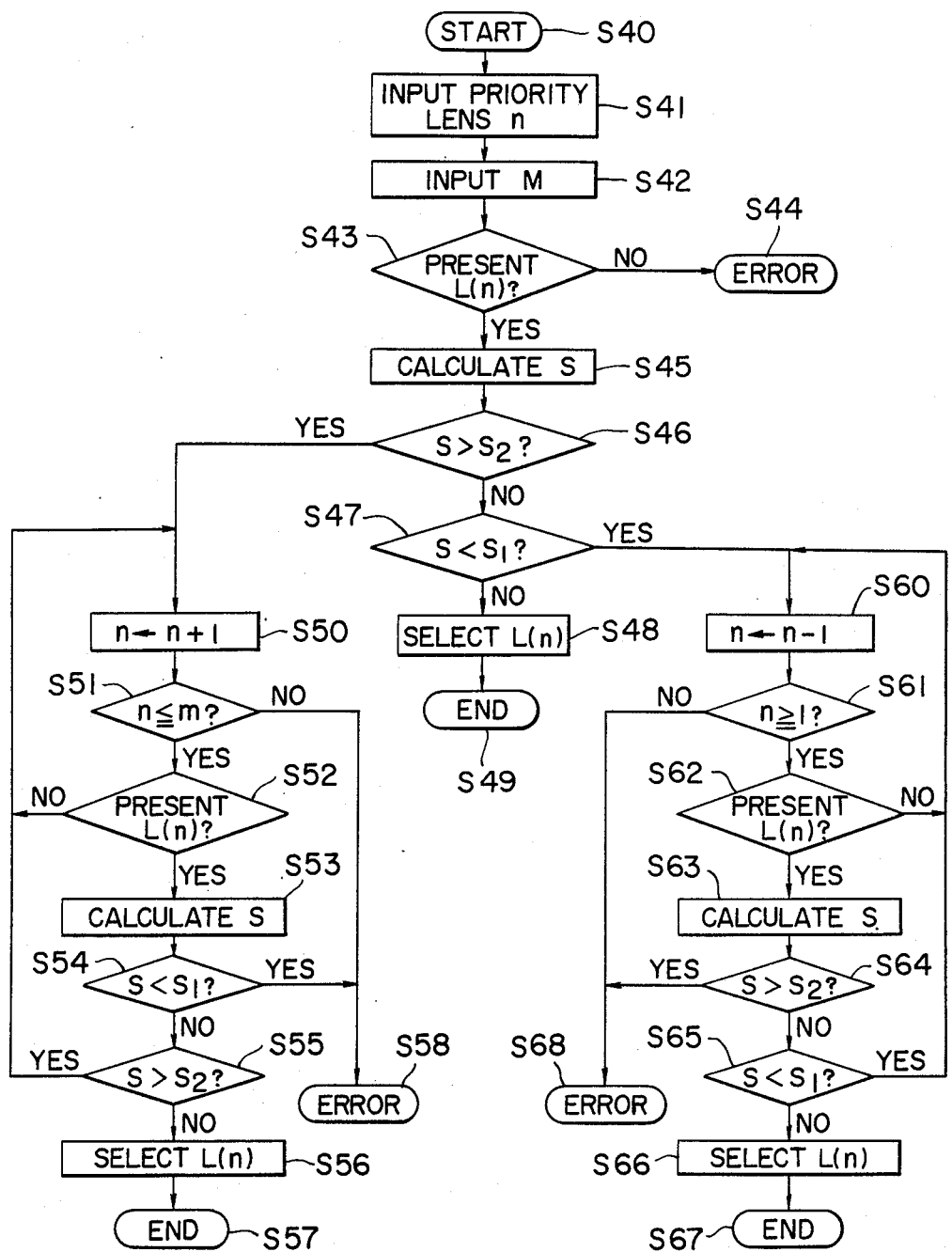
FIG. 10 is a flow chart to showing how the lens units are selected in the second example.

FIG. 10 is a flow chart to explain the lens unit selection method. With the start of automatic selection, a priority lens unit L(n) is designated and then the magnification M of enlargement is inputted (Steps S40 to S42). Then, the priority lens unit L(n) thus designated is judged available or not (Step S43). If NOT, the operation is deemed erroneous (Step S44). If the lens unit is available, then the conjugate length S for the lens unit is calculated in the same manner as mentioned above (Step S45). If the conjugate length S thus calculated falls under the effective range of $S_1$ to $S_2$, the procedure is completed as the priority lens unit L(n) is selected (Steps S46 through S49). If the calculated conjugate length S is greater than the maximum conjugate length $S_2$, the procedure of the Steps S50 through S58 is conducted. If the calculated conjugate length S is smaller than the mimimum conjugate length $S_1$, the procedure of Steps S60 through S68 is conducted. In other words, if the conjugate length S is greater than the maximum conjugate length $S_2$ at the Step S46, and operation is conducted by designating the ordinal number of lens unit as "+1" to select a lens unit L(n+1) having the focal length one degree smaller than the priority lens unit L(n) (Step S50). Upon judging whether the value n thereof is smaller than the ordinal number m or not (Step S51), it is judged whether this lens unit L(n) is available or not (Step S52). The conjugate length S of the lens L(n) is calculated to judge whether same falls within the effective range of $S_1$ to $S_2$ (Steps S54 and S55). If YES, the procedure is completed as the lens L(n) is selected (Steps S56 and S57). If the lens unit L(n) is not available at the Step S52, or if the conjugate length S is greater than the maximum conjugate length $S_2$ at the Step S55, then the operation designating "+1" as in the Step S50 above is conducted before repeating the same procedure as above for searching a lens unit L(n+1) with the focal length one degree smaller than the lens unit L(n). by repeating the procedure, lens unit falling within the effective range can be selected. In case the ordinal number n of the lens is smaller than the ordinal number m of the lens unit with the smallest focal length at the Step S51, or in case the conjugate length S is smaller than the minimum conjugate length $S_2$ at the Step S54, the operation is deemed erroneous (Step S58). The processes of the Steps S60 through S68 that are run when the conjugate length S is smaller than the minimum conjugate length $S_1$ at the Step S47 substantially correspond with the Steps S50 through S58 mentioned in the foregoing description. Therefore, an operation designating the ordinal number n as "−1" is conducted at the Step S60 to consecutively select a lens unit having greater forcal length. At the Step S61, it is judged whether the lens unit L(n) designated by the operation with "−1" is greater than "1" Which is the minimum unit. At the Steps S64 and S65 for judging whether the conjugate length S is in the effective range, the operation is deemed erroneous if the conjugate length S is greater than the minimum $S_2$.

Thus, according to the present invention in which the conjugate length of a selected lens unit is calculated based on specified magnification of enlargement and the focal length of the selected lens to judge whether the conjugate length falls within the effective range, an optimum lens unit can be selected at all times.

The above description is given in terms of a photographic printer as a preferred example of the present invention, but it does not limit the scope of the application. The present invention is applicable to any system which requires correction of exposure due to changing of the lenses, such as a microfilm camera, a microfilm reader printer, a plate making camera, etc.

It should be understood that many modifications and adaptaions of the invention will become apparent to those skilled in the art it is intended to encompass such obvious modifications and changes in the scope of the claims appended hereto.

What is claimed is:

1. An automatic lens selection method for selecting a lens unit among plurality of lens units having different focal lengths in accordance with a designated magnification of enlargement, which is characterized by the steps of:
    selecting a lens unit having the greatest focal length among said plural lens units,
    calculating the conjugate length thereof based on the magnification of enlargement and the focal length of said lens unit,
    judging whether the calculated conjugate length falls within the effective range of a system or not;
    searching a lens unit having the second greatest focal length if said conjugate length falls outside the effective range; and
    repeating the above procedure until a lens unit falling within the effective range is selected.

2. The automatic lens selection method as claimed in claim 1, wherein said plural lens units are represented by 1, 2, ..., n, ..., m in order of shorter focal length, thereby selecting a lens unit from n=1 to m in order, and processing an erroneous process when a number of the selected lens unit becomes to n>m.

3. An automatic lens selection method for selecting a lens unit among plurality of lens units having different focal lengths in accordance with a designated magnification of enlargement, which is characterized by the steps of:
    selecting a lens unit having the smallest focal length from among said plural lens units,
    calculating the conjugate length thereof based on the magnification of enlargement and the focal length of said lens unit;
    judging whether the calculated conjugate length falls within the effective range of a system or not;
    searching a lens unit having the second smallest focal length if said conjugate length falls outside the effective range;
    repeating above procedures until a first lens unit covering said magnification of enlargement is selected;
    calculating the conjugate length of a second lens unit having one degree smaller focal length to judge whether the lens unit is in the effective range if said first lens unit falls under the effective range;
    comparing the diaphragm values of said first and second lens units if the second lens unit is in the effective range;
    selecting a lens unit having a smaller diaphragm value; and
    selecting said first lens unit if the selected lens unit falls outside the range.

4. The automatic lens selection method as claimed in claim 3, wherein said plural lens unit are represented by m, (m−1), ..., n, ... 2, 1 in order of longer focal length, thereby selecting the first lens unit from n=m to 1 in order, and comparing the diaphragm value of the first lens unit with that of the lens unit (n−1).

5. The automatic lens selection method as claimed in claim 4, wherein in the selection of the first lens unit, an erroneous process is performed when a number of the lens unit becomes to n=0.

6. An automatic lens selection method for selecting a lens unit from among plurality of lens units having different focal lengths in accordance with a designated magnification of enlargement, which is characterized by the steps of:
    selecting a predetermined priority lens unit;
    designating a magnification for enlargement;
    calculating conjugate length from the enlargement magnification and the focal length of said priority lens unit;
    judging whether or not said conjugate length is greater than the maximum conjugate length of a system and whether or not the same is smaller than the minimum conjugate length of the system if the above judgement is neither greater nor smaller;
    selecting said priority lens unit if said conjugate length is greater than the maximum conjugate length in above comparison;
    selecting a lens unit having a focal length one degree samller than said priority lens unit;
    calculating a first conjugate length;
    judging whether or not the first conjugate length falls under the effective range;
    selecting a lens unit having a focal length one degree smaller than the above;
    repeating above procedure until a lens unit within said effective range is selected if said conjugate length is smaller than the minimum conjugate length of the system in above comparison step;
    selecting a lens unit having a focal length one degree greater than the priority lens unit;
    calculating a second conjugate length;
    judging whether or not said second conjugate length falls under the effective range if it falls outside said effective range;
    selecting the lens unit having the focal length one degree greater than said priority lens unit; and
    repeating above procedure until a lens unit within the effective range is automatically selected.

* * * * *